United States Patent [19]
Robinson

[11] Patent Number: 5,999,899
[45] Date of Patent: Dec. 7, 1999

[54] LOW BIT RATE AUDIO CODER AND DECODER OPERATING IN A TRANSFORM DOMAIN USING VECTOR QUANTIZATION

[75] Inventor: Anthony John Robinson, Cambridge, United Kingdom

[73] Assignee: SoftSound Limited, Hertfordshire, United Kingdom

[21] Appl. No.: 08/954,417

[22] Filed: Oct. 20, 1997

[30] Foreign Application Priority Data

Jun. 19, 1997 [GB] United Kingdom .................. 9712971

[51] Int. Cl.⁶ ......................................................... G10L 9/08
[52] U.S. Cl. .......................................... 704/222; 704/219
[58] Field of Search .................................... 704/222, 230, 704/200, 203, 205, 206, 207, 208, 500, 219

[56] References Cited

U.S. PATENT DOCUMENTS

| | | | |
|---|---|---|---|
| 4,184,049 | 1/1980 | Crochiere et al. | 704/229 |
| 4,949,383 | 8/1990 | Koh et al. | 395/2.38 |
| 4,969,192 | 11/1990 | Chen et al. | 395/2.31 |
| 5,285,498 | 2/1994 | Johnston | 381/2 |
| 5,303,346 | 4/1994 | Fesseler et al. | 395/2.39 |
| 5,341,457 | 8/1994 | Hall, II et al. | 395/2.35 |
| 5,706,395 | 1/1998 | Arslan et al. | 704/226 |
| 5,806,024 | 9/1998 | Ozawa | 704/222 |
| 5,832,443 | 11/1998 | Kolesnick et al. | 704/500 |

FOREIGN PATENT DOCUMENTS

| | | | |
|---|---|---|---|
| 0396121 | 11/1990 | European Pat. Off. | G10L 9/14 |
| 0513860 | 11/1992 | European Pat. Off. | G10L 7/04 |
| 2269967 | 2/1994 | United Kingdom | H04B 1/66 |
| 89/07866 | 8/1989 | WIPO | H04B 1/66 |

OTHER PUBLICATIONS

IEEE 1988. Johnston, "Transform Coding of audio signals using perceptual noise criteria" vol. 7 pp. 314–323. Feb. 1988.

"Information Technology—Coding of Moving Pictures and Associated Audio For Digital Storage Media at up to About 1,5 Mbits/s—Part 3: Audio", ISO/IEC International Standard 11172–3, pp. 1–9, 109–139, and 147–15 (1993).

"Information Technology—Generic Coding of Moving Pictures and Associated Audio Information—Part 3: Audio", ISO/IEC Draft International Standard 13818–3, pp. 74–79 and 98–99 (May 1994).

Bhaskar, B.R., "Adaptive Prediction with Transform Domain Quantization for Low–Rate Audio Coding", Presented at 1991 IEEE ASSP Workshop on Applications of Signal Processing to Audio and Acoustics, Oct. 20–23, New Platz, NY, 4 pages (1991).

Couch, L.W., "Bandlimited Signals and Noise; Discrete Fourier Transform", Chapter 2–7, from *Digital and Analog Communication Systems*, Macmillan Publishing Co., New York, 105–110 (1993).

Holmes, J.N., "Digital Coding of Speech", Chapter 4, from *Speech Synthesis and Recognition*, Chapman & Hall, London, 54–71 (1995).

(List continued on next page.)

*Primary Examiner*—Richemond Dorvil
*Attorney, Agent, or Firm*—Schwegman, Lundberg, Woessner & Kluth, P.A.

[57] ABSTRACT

Audio source data is subjected to a pre-emphasis step (302) to perform gross decorrelation, followed by an adaptive linear prediction (306) to perform further decorrelation. A transform is performed on the residual of the linear prediction, to obtain transform coefficients representing the residual in the frequency domain. A number of tonal components are identified (310), subtracted from the transform coefficients and encoded by vector quantization. The transform coefficients are then grouped into sub-bands, and each sub-band encoded in the frequency domain by vector quantization. The sub-bands are of uniform width on an auditory scale, so that each vector may comprise a different number of transform coefficients.

70 Claims, 5 Drawing Sheets

OTHER PUBLICATIONS

Makhoul, J., "Linear Prediction: A Tutorial Review", *Proceedings of the IEEE*, 63, 561–580, (Apr. 1975).

Oppenheim, A.V., et al., "Discrete Representation of Signals", *Proceedings of the IEEE*, 60, 681–691, (Jun. 1972).

Pan, D., "A Tutorial on MPEG/Audio Compression", *IEEE MultiMedia*, 60–74, (Summer 1995).

Schroeder, M.R., et al., "Optimizing Digital Speech Coders by Exploiting Masking Properties of the Human Ear", *J. Acoust. Soc. Am.*, 66, 1647–1652, (Dec. 1979).

Strube, H.W., "Linear Prediction on a Warped Frequency Scale", *J. Acoust. Soc. Am*, 68, 1071–1076, (Oct. 1980).

Zwicker, E., et al., "Analytical Expressions for Critical–Band Rate and Critical Bandwidth as a Function of Frequency", *J. Acoust. Soc. Am.*, 68, 1523–1525, (Nov. 1980).

Davidson, G., et al., "High–Quality Audio Transform Coding at 128 kbit/s", Proceedings of the IEEE International Conference of Acoustics, Speech, and Signal Processing; IEEE Press, 1117–1120, (1990).

Gray, R.M., "Vector Quantization", *Readings in Speech Recognition*, A. Waibel and K. Lee, editors, San Mateo, California, reprinted from "IEEE Acoustics, Speech, and Signal Processing Magazine", vol. 1, No. 2, pp. 4–29, Apr. 1985, 75–99, (1990).

Smith, III, J.O., et al., "The Bark Bilinear Transform", Proceedings of the IEEE Workshop on Applications of Signal Processing to Audio and Acoustics; IEEE Press, 1–5, (Oct. 1995).

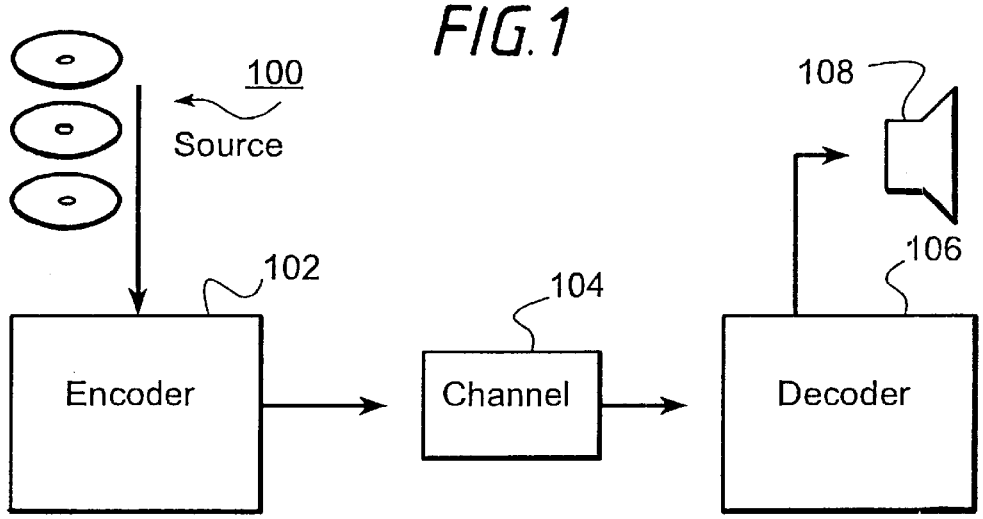
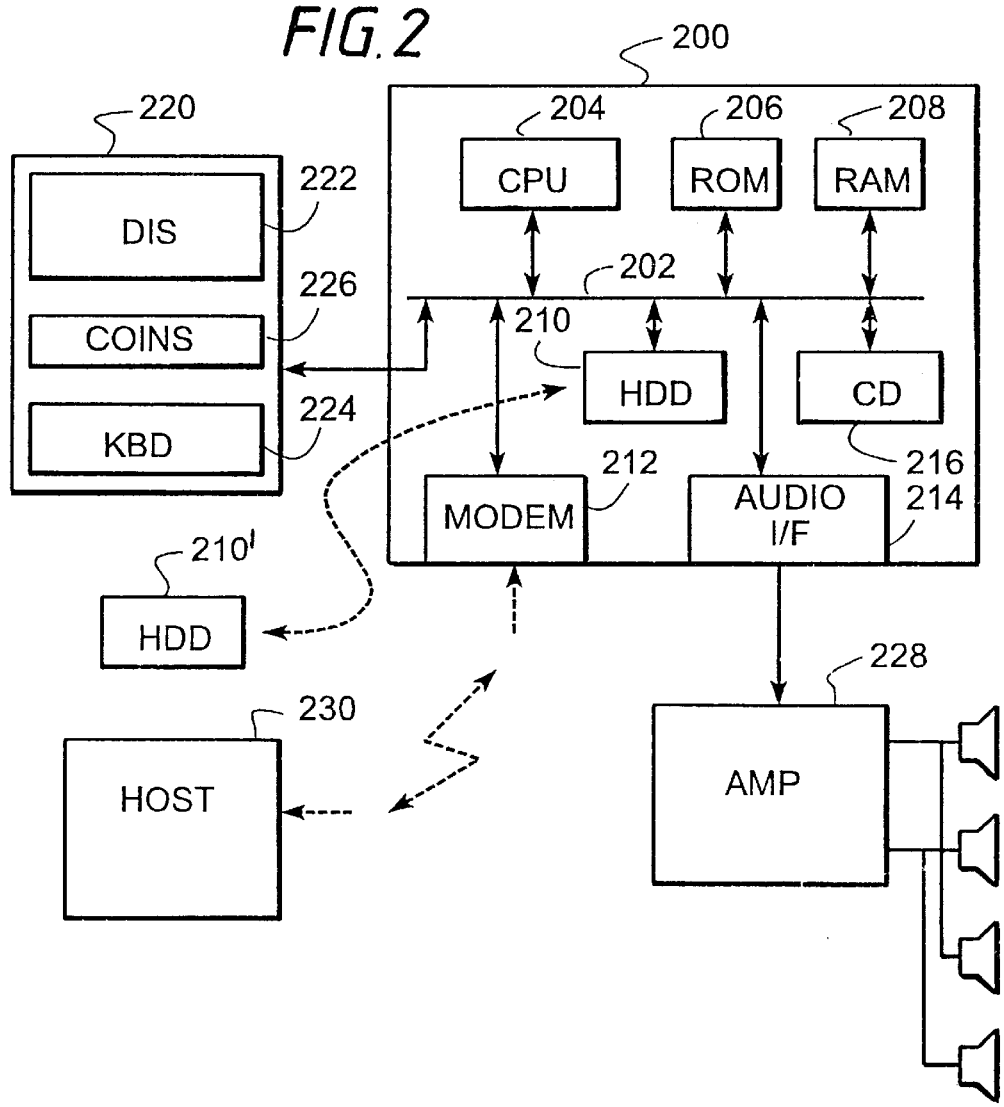

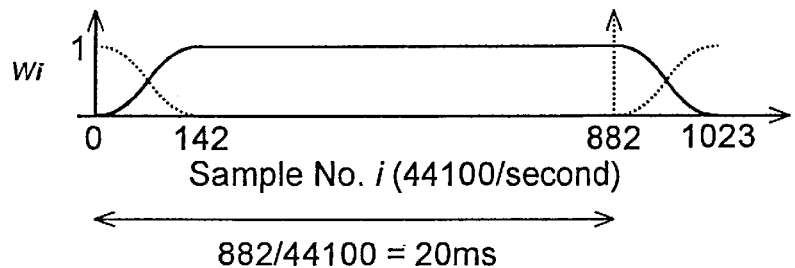
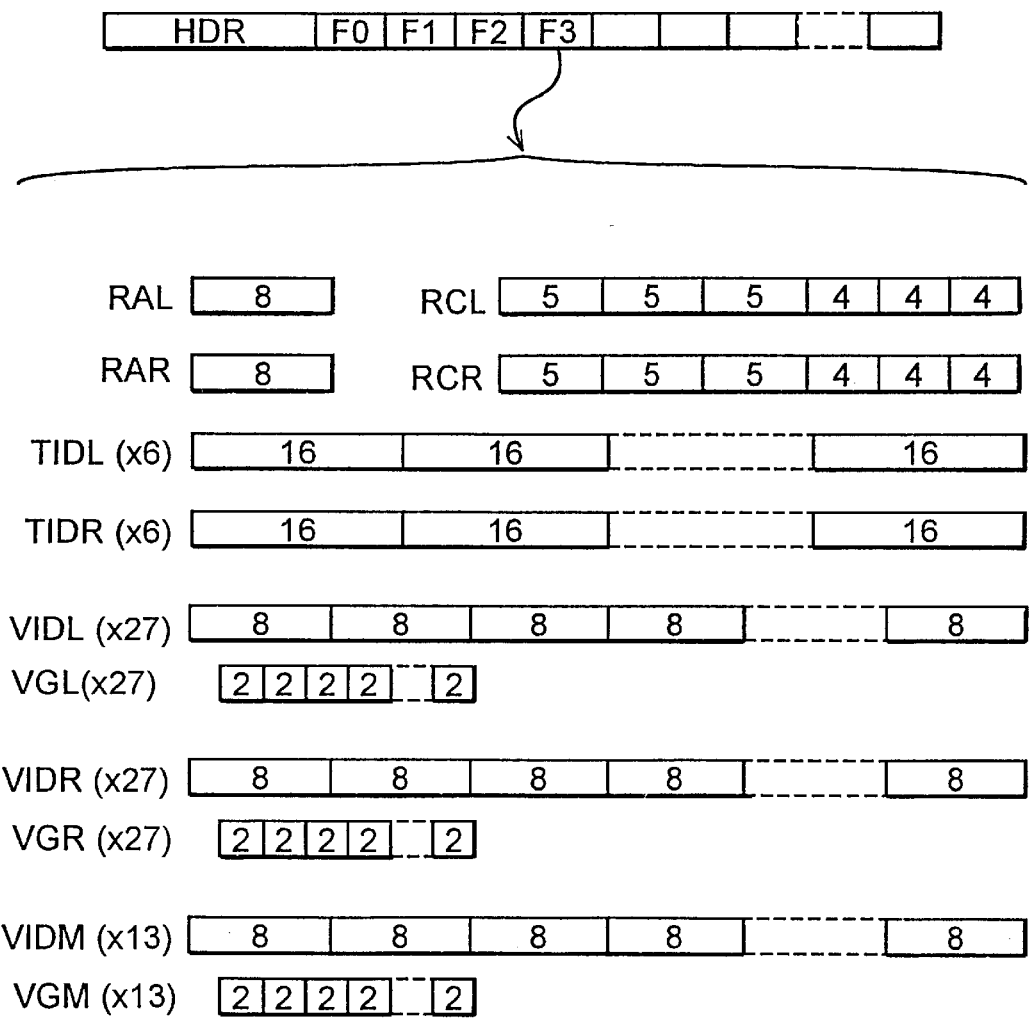

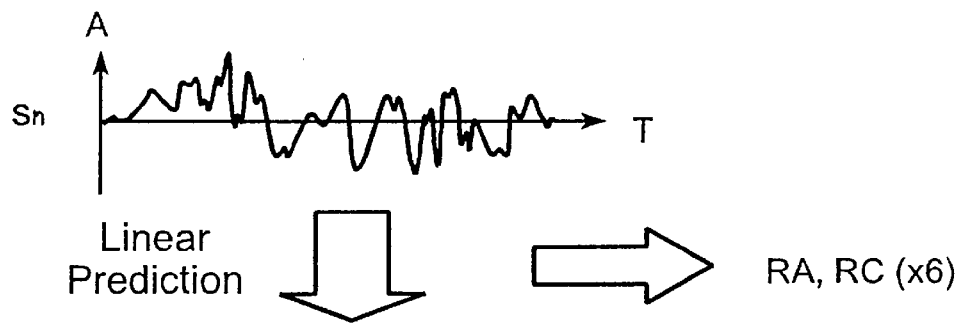
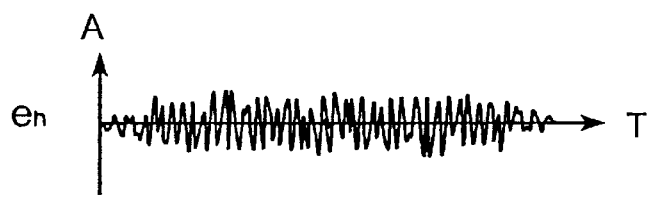
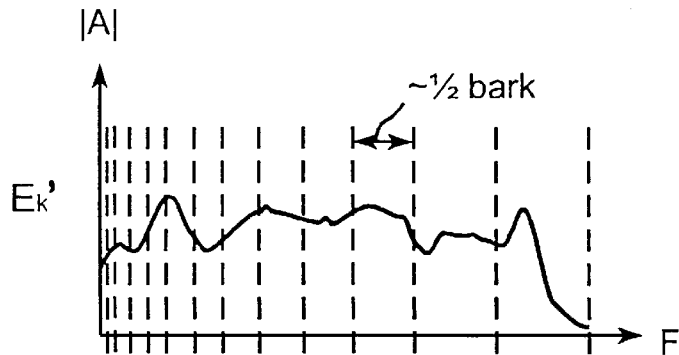
FIG. 6

LOW BIT RATE AUDIO CODER AND DECODER OPERATING IN A TRANSFORM DOMAIN USING VECTOR QUANTIZATION

The invention relates to methods and apparatuses for encoding and decoding audio signals at low bit rates. The invention is applicable to provide compression of full bandwidth, dual channel audio to a bit rate in the approximate range of 140,000 to 28,000 bits per second, which would allow, for example, 17 to 85 hours of music to be stored on a 1 gigabyte magnetic or optical disk.

Various techniques for the compression of audio signals are known. A simple example is adaptive differential pulse code modulation (ADPCM), which predicts the next sample using previous samples and an adaptive predictor, and transmits only the difference between the actual sample and the prediction. Such coders are often fast and work with low algorithmic delay. However, the bit rate cannot usually be reduced below several (for example 3) bits per sample, and it is difficult to exploit psychoacoustic factors such as auditory masking in ADPCM format.

Audio coding systems known as sub-band coders have been proposed to achieve higher compression, for example as described in "UA Tutorial on MPEG/Audio Compression" by Davis Pan in IEEE Multimedia, Summer 1995, pages 60 to 74. Full detail of the MPEG/Audio Compression system comprises ISO/IEC International Standard IS11172-3 "Information Technology—Coding of Moving Pictures and Associated Audio for Digital Storage Media at up to about 1.5 Mbits/S—Part III: Audio." The MPEG/Audio system divides time domain signals for a frame of audio samples into 32 frequency sub-bands. Auditory masking is used to determine the resolution to which each sub-band is coded. It is possible that an entire sub-band is effectively inaudible, and therefore need not be encoded at all.

Another approach which can exploit psychoacoustic masking is transform coding. Transform coders employ windowing and linear transforms such as the fast Fourier transform (FFT) to split the signal into overlapping frames that are represented in the transform domain (e.g. the frequency domain). Again, auditory masking may be used to determine the number of bits that are used to code each of the transformed values. One example is described by G Davidson, L Fielder and M Antill, in "High-Quality Audio Transformed Coding at 128 kbits/s" (1990 IEEE F CH2847-2/90/0000-1117), and their patent application EP-A-0513860 explains much of the background and terminology relevant to such coders.

The MPEG/Audio system is intended to provide high quality audio for consumer applications at various bit rates, ranging from 32 to 224 kbits/s per channel (left and right). The coding of Davidson et al aims to provide higher, "professional" quality audio, at 128 kbits/s per channel.

Code excited linear prediction (CELP) is another form of coding which employs a vector quantized codebook (in the time domain) to represent the excitation signal for a linear predictor. The system is most often used to model human speech signals, in coding systems where an additional long-term predictor is used to model periodic sounds (such as vowels). A similar technique purportedly adapted for general audio signals is proposed by B R Udaya Bhaskar in the paper "Adaptive prediction with transform domain quantization for low-rate audio coding", Proceedings of the IEEE Workshop on Applications of Signal Processing to Audio and Acoustics, New Paltz, N.Y., October 1991. The "APC-TQ" coder of that proposal uses short-term and longer-term linear predictors to decorrelate the audio signal, followed in one version by adaptive vector quantization in the Fourier transform domain.

The present inventor has recognised that using such time domain techniques (long-term linear prediction) to model periodic (tonal) components is not so effective in coding general audio material such as music, where many unrelated periodic components may be present at one time. The APC-TQ coder also uses a standard linear prediction, rather than warped frequency linear prediction, which the present inventor believes is better matched to the desired quantization. The adaptive vector formation in APC-TQ also involves explicit analysis of spectral power and auditory masking phenomena, and involves overhead in the data stream and/or a more complex decoder to allow the decoded vectors to be untangled into the correct transform coefficients.

The present invention aims to provide alternative compression systems for compression of audio material, for example to provide consumer quality audio for applications where a higher level of compression is desired than MPEG can offer for a given subjective quality level. In a "computerised jukebox" application, for example, such compression will permit large numbers of musical tracks to be provided on a single optical or magnetic disk for rapid access at low hardware cost, as opposed to a large number of separate audio compact discs being loaded physically in a conventional mechanical jukebox. The compressed music collections can be updated more easily, even remotely if desired, while the PC-based jukebox unit can be made cheaper and more compact than a conventional CD-based jukebox. As another example, solid-state memory cards could be used as an alternative to tape cassettes in personal stereo applications. Compressed music could be quickly downloaded by wire or wireless link and stored in the compact personal stereo unit or memory card, instead of carrying pre-recorded ROM cards. The encoding and decoding can readily be implemented in software and/or dedicated hardware, depending on the cost/performance considerations of each application.

The invention provides a method of encoding a digital audio signal comprising:
   transforming the audio signal in successive overlapping frames so as to obtain transform coefficients representing the signal in a transform domain; and
   grouping the transform coefficients into vectors and encoding them by vector quantization to form a first component of encoded audio data,
characterised by subtracting from the transform coefficients for each frame prior to said vector quantization at least one tonal component, and encoding said tonal component(s) explicitly as a second component of the encoded data.

The invention further provides compatible decoding methods and recordings of encoded audio signals.

An embodiment of the invention described herein operates using a combination of linear prediction, Fourier transform and fixed vector quantization techniques. Various other aspects of the coder will be seen to be novel in relation to the prior art. The coder disclosed herein has similarities with the APC-TQ coder, and could be described as a code excited linear prediction scheme where the codebooks are formed in the transform (frequency) domain. However, whereas the known coders aim to model the audio signal in the time domain (optionally using a perceptual weighting filter), the present coder aims also to model the prediction residual in a frequency dependent manner.

In accordance with another aspect of the invention, the embodiment uses a fixed linear prediction to perform gross decorrelation, followed by a bilinear-based linear prediction for adaptive decorrelation, to condition the signal into a form suitable for vector quantization in the frequency domain.

In accordance with a third aspect of the invention, vector quantization is used to represent sub-band information in the frequency domain. If combined with ideal decorrelation as described above, codebook indices could be transmitted without separate gain values. On the other hand, to allow for imperfect or no decorrelation while minimising the overhead represented by gain values, differential or predictive coding of the gain values from frame to frame can be used.

Further novel aspects of the system described will be apparent to the skilled reader.

BRIEF DESCRIPTION OF DRAWINGS

Embodiments of the invention will now be described, by way of example only, with reference to the accompanying drawings, in which:

FIG. 1 illustrates generally the context of audio encoding and decoding processes according to the present invention;

FIG. 2 is a block diagram of a computerised jukebox apparatus employing the encoding and decoding techniques of the present invention;

FIG. 4 shows a window function used in the encoding process of FIG. 3;

FIG. 5 illustrates the format of the encoded audio data produced by the encoding process of FIG. 3;

FIG. 6 illustrates the form of signals at various stages in the encoding process of FIG. 3;

DETAILED DESCRIPTION OF DRAWINGS

INTRODUCTION

Figure 3:
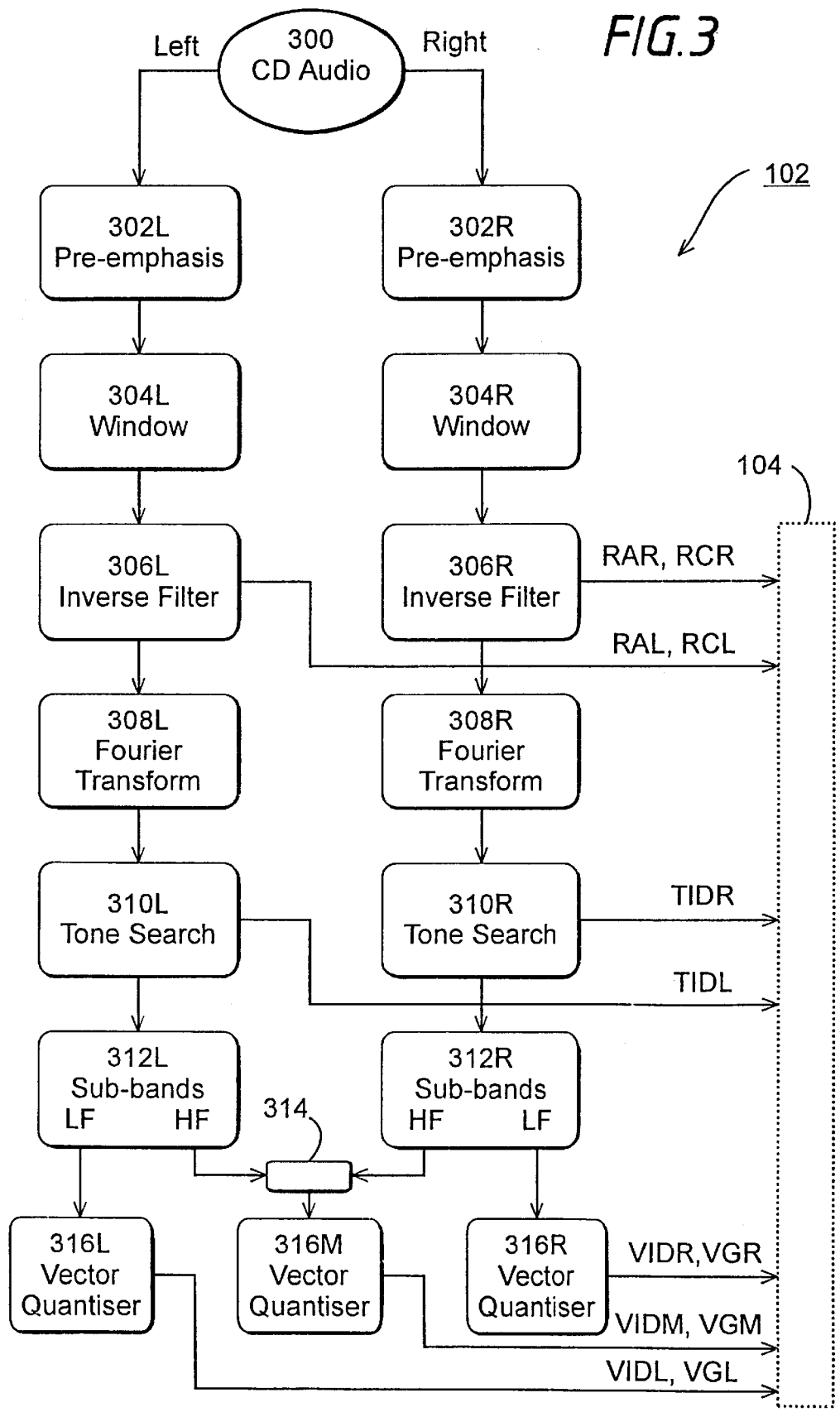
FIG. 3 is a block diagram of an audio encoding process performed in the apparatus of FIG. 2.

FIG. 1 illustrates schematically the encoding and decoding process for audio information. At 100 a source of analog or digital audio information is illustrated, which most typically will comprise digital audio data from digital audio tape (DAT) or compact disc (CD) recording, but could equally be converted to digital form from live or recorded analog audio sources.

An encoder 102 is provided which compresses the digital audio information received from the source 100 and passes it to a transmission channel 104. Through the channel 104, the encoded audio data is received by a decoder 106, whose output can be converted to analog form and reproduced immediately as sound through a loudspeaker 108, or can of course be recorded or further transmitted in digital or analog form, according to the application.

The skilled reader will appreciate that the channel 104 may in practice comprise a variety of physical and/or logical transmission channels. While it may for example be a radio or land-based telecommunications link, with live transmission from the encoder 102 to the decoder 106, it may equally typically comprise a storage medium such as a computer disk memory, data tape or CD-ROM. The purpose of storage may be simply convenient storage of a large amount of audio information in one place for later reproduction, or the storage medium carrying encoded signals can be forwarded for reproduction by the decoder 106 at a remote location.

FIG. 2 shows, as just one possible example, an embodiment of a decoder and encoder according to the present invention within a "computerised jukebox" apparatus.

A main unit 200 of the apparatus comprises the components of a conventional personal computer (PC) with audio capabilities. In particular, a bus 202 is provided which connects a central processing unit 204 with read-only memory (ROM) 206 and random access memory (RAM) 208 in a conventional manner. Also connected to the bus 202 are one or more magnetic hard disk storage devices (HDD) 210, a telephone or ISDN modem 212, an audio interface 214, and a CD-ROM drive 216, all of a type well known and widely available in "entry level" PCs at the present priority date. For the input of audio source data, digital audio data can be obtained directly using CD-ROM drive 216 connected to the bus 202, or via interface 214.

For the jukebox application, the conventional display and keyboard of the PC are replaced by or augmented by a user unit 220 containing a display screen 222 for the displaying of available musical selections in words and/or pictures; a keyboard adapted for the browsing and selection of musical tracks to be played by the jukebox; and a coin box mechanism 226 by which users can pay for their selections. An amplifier and speaker system 228 receives decoded audio signals from audio interface 214, for reproduction of decoded sound at the desired locations.

For the embodiments of encoding and decoding processes to be described in more detail below, the "entry-level PC" components of the main unit 200 are capable of decoding stereo sound from encoded data, received at a rate of approximately 47000 bits per second, in approximately one third to one half real-time. At this data rate, for example, forty-seven hours of music could be stored on a single one gigabyte HDD 210, readily available from computer suppliers.

The same main unit 200 can receive source data from CD-ROM drive 216, and encode it for storage on the HDD 210. However, it is expected that, in contrast to decoding, encoding will be slower than real-time on the same PC. Accordingly, a more typical scenario will provide an encoder comprising the same or a more powerful PC and/or specialised hardware, at a remote location. Then removable HDD devices (shown as 210' in FIG. 2) can be filled with encoded music and despatched for insertion in main unit 200 of the jukebox apparatus. Alternatively, an organisation supplying the jukebox may transmit encoded audio information directly to main unit 200 using modem 212, for updating some or all of the selection of encoded music stored on HDD 210. A host computer is illustrated at 230, which can perform the encoding and transmitting functions. The same communications link can be used for downloading from the jukebox apparatus diagnostic information and statistics on the popularity of the various selections stored within the jukebox apparatus. It will readily be appreciated that, in such a system, the cost of providing and operating the jukebox, as well as the space occupied and the range of programme material that can be provided, are greatly enhanced by adopting digital storage of compressed audio data. It will also be appreciated that many other applications besides the jukebox are possible for the encoding techniques disclosed herein.

The following description firstly provides some background, then follows the signal path from the uncompressed audio signal through to the coded format and outwards to the reconstructed audio signal.

BASIC TECHNIQUES

Windowing

Windowing refers to the procedure whereby a signal is multiplied by a function which is zero outside some range, to divide it into a series of "frames" for coding. Thus a portion of the original signal is removed. This embodiment uses a flat-topped window with cosine-rounded ends defined by Equation (1).

$$w_i = \begin{cases} 0 & i < 0 \\ \frac{1}{2} - \frac{1}{2}\cos(\pi(i+\frac{1}{2})/(N-M)) & 0 \le i < N-M \\ 1 & N-M \le i < M \\ \frac{1}{2} - \frac{1}{2}\cos(\pi(N-M-i+\frac{1}{2})/(N-M)) & M \le i < N \\ 0 & i \ge N \end{cases} \quad (1)$$

FIG. 4 shows an example of this window. This window exhibits the "perfect reconstruction property", in that when it is repeated every M samples (shown by broken lines) the summation of all window functions is unity (see Equation (2)).

$$\sum_{n=-\infty}^{\infty} w_{i-nM} = 1 \quad \forall i \quad (2)$$

Overlap and add refers to a technique whereby a signal is decomposed into a series of frames using a window function that obeys the perfect reconstruction property. Each frame may then be processed separately (for example compressed and later decompressed) independently of the other frames of the signal. The reconstructed frames are added with the appropriate overlap (nM) to provide a reconstructed signal.

As illustrated in FIG. 4, with a sample rate of 44.1 kHz, N=1024 and M=882 will give a frame every 20 ms and an overlap of approximately 3 ms at each end. Other parameters and other window functions may of course be used.

Linear Prediction

Linear prediction refers to a technique whereby an estimate, $\hat{s}_n$, of the next audio sample is generated by a linear combination of past audio samples, $s_{n-1}$ (see Equation (3)).

$$\hat{s}_n = \sum_{i=0}^{p} a_i s_{n-i} \quad (3)$$

A standard tutorial article is J. Makhoul, ("Linear prediction: A tutorial review", Proceedings of the IEEE, 63(4): 561–580, April 1975). There are also books by J. Markel and A. Gray ("Linear Prediction of Speech", Communication and Cybernetics, 1976) and L. R. Rabiner and R. W. Schafer ("Digital Processing of Speech Signals", Prentice Hall, Englewood Cliffs, N.J., 1978) which explain the basic techniques that are applied herein.

The signal estimate, $\hat{s}_n$, may be taken away from the true sample, $s_n$, to generate a new signal, $e_n$ ("prediction error" or "residual"), as shown in Equations (4) and (5).

$$e_n = s_n - \hat{s}_n \quad (4)$$

$$= s_n - \sum_{i=0}^{p} a_i s_{n-i} \quad (5)$$

The coefficients $a_i$ may be chosen to reduce the variance of $e_n$ and so decorrelate the signal. In the present embodiment, the "auto-correlation method" (also known as Durbin's algorithm) provides a suitable method for the estimation of $a_i$. Note that $s_n$ may be recovered exactly from $e_n$ and $a_i$.

Linear prediction may also be performed with respect to a warped frequency scale, and in particular the bilinear transform may be used in order to approximate the Bark scale frequency resolution of the ear. For more detail see: Alan V. Oppenheim and Donald H. Johnson, "Discrete representation of signals", Proceedings of the IEEE, 60(6) :681–691, June 1972; Hans Werner Strube, "Linear prediction on a warped frequency scale", Journal of the Acoustical Society of America, 68(4):1071–1076, October 1980; and Julius O. Smith and Jonathan S. Abel, "The Bark bilinear transform", Proceedings of the IEEE Workshop on Applications of Signal Processing to Audio and Acoustics, New Paltz, N.Y., October 1995, IEEE Press.

Fourier Transforms

A Fourier transform maps a time domain representation of a signal into a frequency domain representation. In the present embodiment we employ the short-term, discrete time Fourier transform (DFT) defined in Equations (6) and (7). In these equations, $X_k$ are frequency domain coefficients of the signal represented by time domain samples $X_n$.

$$X_k = X\left(e^{i\frac{2\pi kn}{N}}\right) \quad (6)$$

$$= \sum_{n=0}^{N-1} x_n e^{-i\frac{2\pi kn}{N}} \quad (7)$$

An exact inverse transform (IDFT) exists as shown in Equation (8).

$$x_n = \frac{1}{N} \sum_{k=0}^{N-1} X_k e^{i\frac{2\pi kn}{N}} \quad (8)$$

These equations may be implemented in a recursive fashion and the resulting algorithm is well-known as the fast Fourier transform (FFT), described in J. W. Cooley and J. W. Tukey, "An algorithm for the machine calculation of complex fourier series", Math. Computat., 19:297–301, 1965.

Note that, by using windows that obey the perfect reconstruction property, a signal can in principle be decomposed into overlapping windowed signals, Fourier transformed, inverse Fourier transformed, overlapped and added up again to reconstruct the original signal exactly. This overlap and add method is more fully described in the book by Rabiner and Schafer. In practice, a fraction of the windowing function is applied at the encoding side, and the remaining fraction applied at the decoding side, to reduce quantization noise arising in the frequency domain.

Also note that the Fourier transform operation is linear, so a template match in terms of Euclidean (least mean squares) distance may be carried out either in the time domain or the frequency domain. This property is not often used and is exploited below in both the tone search and the final (sub-band) vector quantization processes.

Vector Quantization

This technique represents a vector (a collection of several component variables) by the closest matching vector from a codebook of prototypes. A standard reference is R. M. Gray, "Vector quantization", IEEE ASSP Magazine, 1(2): 4–29, April 1984, and a popular codebook design procedure is known as the Linde, Buzo, Gray algorithm after the authors of Y. Linde, A. Buzo, and R. M. Gray, "An algorithm for vector quantizer design", IEEE Transactions on Communications, 28: 84–95, January 1980.

Auditory Masking

Auditory masking is the process whereby a quiet sound cannot be heard if a loud sound of a similar frequency is also present. The closeness of the two frequencies is measured on a non-linear frequency scale known as the critical band scale or Bark scale. Further background can be found in an article by E. Zwicker, "Subdivision of the audible frequency band into critical bands (frequenzgruppen)", Journal of the Acoustical Society of America, 33:248, 1961. Tutorials on the use of auditory masking may be found in the Davis Pan article mentioned above, and an article by M. R. Schroeder, B. S. Atal, and J. L. Hall, "Optimizing digital speech coders by exploiting masking properties of the human ear", Journal of the Acoustical Society of America, 66(6):1647–1652, December 1979.

THE ENCODING PROCESS

FIG. 3 shows schematically the encoding process according to one embodiment of the invention, which may be implemented for example in the jukebox apparatus of FIG. 2. It will now be described how the signal flows from the source 100 through the encoder 102 to the storage/transmission medium 104 (FIG. 1), with reference also to FIGS. 4, 5 and 6.

CD Audio Input Stage (300)

The term "CD audio" refers to a full-band, dual-channel audio signal as might be found on a conventional audio Compact Disc. The sampling rate is normally 44100 Hz and samples are normally represented as 16-bit values with the left and the right channels interleaved. The present coder expects such a signal in RIFF WAVE format, although the coder could easily be adapted to deal with different formats (and also to deal with single channel audio such as a signal sampled at 8 kHz for telephony). To a large degree the left and right channels are processed independently, as shown by the left and right signal paths in FIG. 3. The suffices L and R are used in the drawings to distinguish the left and right paths, but the following description is common to both paths except where noted.

Fixed Pre-emphasis (302)

The first stage 302 of the encoding process is a fixed filter that reduces the power at low frequencies and increases the power at high frequencies. The form of the filter is one of linear prediction (Equation (5), above) with fixed coefficients $a_i$ and with the error signal $e_n$ forming the input to the following stages.

As most audio signals have more power at low frequencies than high frequencies this filter has the effect of performing some decorrelation (spectral whitening) to facilitate compression. In particular, decorrelation reduces frame noise and reduces the significance of spectral leakage when performing the FFT or similar transform operation (see below).

In the present embodiment the fixed pre-emphasis of step 302 is performed using the filter:

$$S_n' = S_n - 0.972 S_{n-1} \qquad (9)$$

The value 0.972 for the coefficient $a_1$ was obtained by experiment so as to maximise the gain normalised on a frame-by-frame basis, for a range of audio samples.

As shown at the top of FIG. 5, the encoded data stream comprises a header block HDR followed by individual blocks F0, F1 etc obtained from successive overlapping frames of the audio signal. In addition to information identifying for example the total number of frames and perhaps some identification of the content of the coded signal, the header block HDR can carry "fixed" parameters of the encoding process, such as the sample rate and the coefficient(s) employed in the pre-emphasis step 302. Such parameters can thus be adapted to different situations, while remaining fixed from frame to frame of a given recording.

Flat Topped Window (304)

The signal after pre-emphasis is then split into frames at step 304 using the flat topped window of FIG. 4. A simple rectangular window is not often used because it has large side lobes in its frequency response which place significant power away from the underlying frequency components. However, the use of a flat-topped window allows a larger period to be used as the frame advance and hence a lower bit rate.

In the present embodiment, the windowing function used at 304 in the encoder is in fact only the square root of the windowing function defined in Equation (1). The "other half" of the windowing function is reserved to be applied at the overlap-and-add stage in the decoding process, described below. Thus the product of the two windows applied during encoding (analysis) and decoding (synthesis) constitutes the windowing function of Equation (1) and FIG. 4, maintaining the perfect reconstruction property described above.

As shown in FIG. 4, frames of 1024 samples are taken every 882 samples, so that one frame will be obtained every 20 milliseconds. One frame constituting 1024 samples $s_n$ over a time interval of approximately 23 milliseconds is illustrated in the first graph of FIG. 6.

Inverse Filter (306)

At 306 another linear prediction is performed, this time with coefficients which are estimated from the windowed signal for the current frame. The term "inverse filter" is used in reference to the filter in the decoder having coefficients $a_i$ (Equation 5). The filter order is short, typically 6, and the aim is to provide better decorrelation and thus result in a signal which is approximately spectrally flat. The coefficients of the inverse filter in the present embodiment are obtained from a Bark-scaled power spectrum where the Bark scaling is performed through a warping parameter of 0.723, as described in the papers by Oppenheim and Johnson, Strube, and Smith and Abel mentioned above. As shown for example in FIG. 4 of the paper by Smith and Abel, the appropriate value for the warping parameter (or "allpass coefficient") depends on the sampling frequency.

An efficient implementation can be achieved using Fourier transforms. The autocorrelation function is the Fourier transform of the power spectrum and the linear prediction parameters may be obtained from the autocorrelation function. The warping of the power spectrum may be defined as a linear function, as is the computation of the first p autocorrelation values. Thus both linear functions may be combined into one matrix and the warped autocorrelation function obtained from the power spectrum by a matrix multiplication. Further details of such an implementation may be found in "Method 1" of the Strube article mentioned above, where alternative methods are also described.

The linear prediction at 306 provides the first components of the block of data to be transmitted for the current frame, as shown in FIGS. 3, 5 and 6. The numbers of bits allocated to each item in the present embodiment are shown in the data structure of FIG. 5. For the right hand channel, an amplitude (scaling factor) RAR for the residual of the linear prediction is generated per frame, together with six normalised reflection coefficients RCR. Similarly for the left channel, a residual amplitude RAL and six normalised reflection coefficients RCL are generated. The reflection coefficients are quantized in the encoded bit stream with the first three coefficients for each channel having five bits each. The last three are less important and have only four bits each. The residual amplitude for each channel is quantized to eight bits. Non-uniform quantization steps are used, optimised according to typical signal content The error $e_n$ remaining after the linear prediction is calculated, according to Equation (5) above, for each sample in the frame, and this is passed to step 308 for further processing.

Fourier transform (308)

The standard real-valued FFT algorithm is used at step 308 to transform the windowed, inverse filtered signal into the frequency domain. It is a property of the FFT that a real signal results in a symmetric transformed signal and thus only the lower half of the result need be coded. In common with many implementations of the FFT the complex result is returned as adjacent locations in memory. The remainder of the algorithm treats the results as a vector of real numbers of dimensions N (as in equation 4) rather than a vector of N/2 complex numbers. Since N=1024 in this example, 512 unique complex coefficients are generated per channel, per frame, which are treated as a vector of 1024 real numbers. The coefficients $E_k$ produced by the FFT represent real and imaginary components of the signal in 512 separate frequency bins evenly spaced across the spectrum from DC to one half of the sampling frequency. With the sampling frequency equal to 44.1 kHz and N=1024, each bin represents 43 Hz in the frequency domain. These coefficients are passed to the next stage 310 of the encoding process, where tone extraction is performed.

Tone Search (310)

Audio signals are often composed of musical notes or tones. Four tones are indicated schematically in the spectrum $E_k$ of FIG. 6, and marked with '*'. For the purposes of this description we define a tone as being a single frequency component which can be characterised by a frequency, amplitude and phase. Prior knowledge of audio signals is used to define a distribution over each of these variables and hence form a codebook in the frequency domain. The entries are generated in a pseudo-random fashion, with the distribution in frequency being warped so that it is uniform on an auditory (for example mel) scale. In the embodiment being described, the codebook has 65536 entries.

The tone search operation 310 thus comprises a search though this codebook for the entry which has the least Euclidean distance from the FFT coefficients. Although in principle each vector in the codebook might contain 1024 coefficients, the frequency domain representation of the tone in the codebook is in practice limited to neighbourhood of the central band approximately five frequency bands in the central band (ten real numbers in total). This allows for some independence in the search procedure, yielding considerable speed improvements over a simple exhaustive search.

The best matching tone vector is subtracted from the frequency domain coefficients ($E_k$ in FIG. 6), and the process repeated to find the next best matching tone. The embodiment identifies six best matching tones in this way, whose codebook indices (16-bits each) are sent to the transmission channel 104 as data TIDL (left channel) and TIDR (right channel).

Sub-band Analysis (312)

After the tones have been extracted and their codebook indices sent separately, the modified coefficients ($E_k'$ in FIG. 6) are subjected to sub-band analysis at step 312. In this particular embodiment, the 512 coefficients are simply grouped into 40 fixed sub-bands, of different widths. The sub-band boundaries are placed at equal spacing on an auditory scale. The Bark scale is currently used, as in MPEG, and as described in E. Zwicker and E. Terhardt, "Analytical expressions for critical-band rate and critical bandwidth as a function of frequency", Journal of the Acoustical Society of America, 68(5): 1523–1525, 1980. A spacing between 0.5 and 1.0 Bark is judged appropriate. At the lowest frequencies, each sub-band may contain only a couple of transform frequency bins, while the highest band will comprise 60 or so frequency bins.

Bearing in mind that the human auditory system obtains the majority of stereophonic positional information from the amplitude and phase of lower frequency components, the top frequencies for the left and right channel are added together at 314 to form a single middle channel. The suffix M is used in the drawings to distinguish this middle channel from the left (L) and right (R) channels, which remain separate in the lower frequency range. The addition at 314 in fact weights the left and right channels in accordance with the corresponding residual amplitudes (RAR, RAL) determined for the current frame, so as to simplify the synthesis process at the decoder.

The cut-off frequency for the middle channel can be defined for example as 4000 Hz. As explained already, for each of the left, middle and right channels the frequency domain vector is grouped into a number of sub-bands. With the audible spectrum divided into 40 sub-bands at 0.63 bark spacing, the lower frequency range in the present embodiment contains 27 sub-bands, while the upper frequency range (middle channel) comprises 13 sub-bands.

Vector Quantization (316)

At step 316, for each channel L, M and R, a codebook of typically 256 entries is examined to obtain a codebook index and gain value for each sub-band. The 8-bits of the codebook index and 2-bits for the gain are transmitted to represent the shape of the spectrum ($E_k'$ in FIG. 6) in each sub-band. As shown in FIGS. 3, 5 and 6, the data VIDR, VIDM and VIDL comprise the codebook indices for the sub-bands in the right, middle and left channels respectively, and data VGR, VGM and VGL comprise the corresponding gain values.

In the vector quantization of step 316, a common codebook is used for all the sub-bands, even though each sub-band vector actually comprises a different number of coefficients. It would be possible to define individual codebooks for each sub-band, or for sub-ranges of sub-bands. However, the present embodiment uses one codebook having vectors as long as the longest sub-band vector, the shorter vectors for the lower frequency sub-bands being encoded with reference only to the first few elements of the codebook entries.

For the transmission of the gain values VGR, VGM, VGL, predictive coding is used, since the correlation of the gain value is high between neighbouring frames. The present implementation of gain prediction uses a weighted sum of past decoded gains as the basis for prediction. The difference between the predicted value and the desired gain is encoded as a fraction of the current step size using a simple table of quantized values. The step size is updated according to the chosen codebook index using another look-up table. In another embodiment the past decoded amplitudes of the VID channels could be used as the basis of prediction. In principle, further embodiments are possible in which codebook gains are not separately transmitted, since an ideal decorrelation performed in the earlier steps 302, 306 and 310 should leave a purely "white" spectrum, with equal energy in each sub-band.

The encoding process for one frame is complete at step 316, and the data generated per frame can be transmitted or stored via the channel 104 for subsequent decoding.

DECODER

Figure 7:
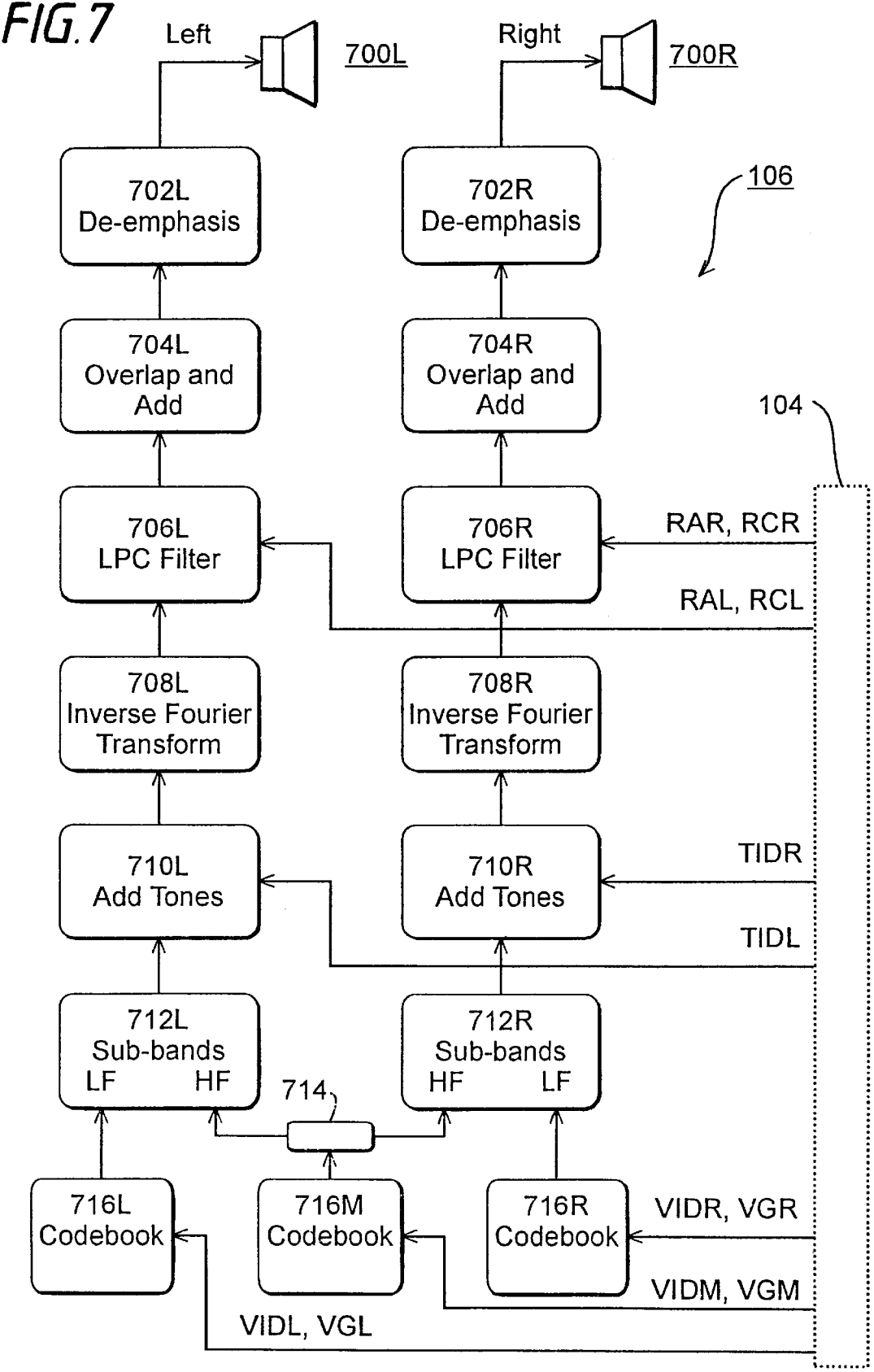
FIG. 7 is a block diagram of the decoding process corresponding to the encoding process of FIG. 3.

FIG. 7 shows the signal flow in the decoder corresponding to the encoder of FIG. 3. In general, each of the operations 302 to 316 of the encoder of FIG. 3 is simply mirrored by an inverse operation 702 to 716 in the decoder, and these are performed in reverse order to obtain a decompressed approximation of the original audio source signal.

In particular, at 716 the indices and gains VIDL, VIDM, VIDR, VGFL, VGM, VGR for the vector quantized sub-band information are retrieved from the channel 104 and used to obtain the transform coefficients $E_k'$ for each sub-band by reference to the same codebook as was used in the vector quantization step 316 in the encoder. The middle channel is split according to the appropriate weighting to recover the high frequency transform coefficients from the left and right channels at 714. At 712 the coefficients for the sub-bands are concatenated again into a single spectrum for each of the left and right channels.

At 710, the codebook indices TIDL and TIDR for the tones extracted at step 310 in the encoder are applied into a codebook matching the one used at step 310, and the resulting vectors added to recover the complete spectrum $E_k$.

The recovered spectrum is subjected at 308 to the inverse Fourier transform, to obtain a time domain signal approximating the linear predictor error signal $e_n$. At 706 these samples $e_n$ are applied to the linear predictor whose inverse was used in the encoding step 306, in accordance with the gains RAL, RAR and the coefficients RCL, RCR received through the channel. At 304, the square root of the window function of Equation (1) is again applied to the recovered time domain signal, and successive frames are overlapped and added to recover a single stream of samples. At 702, the inverse function of the pre-emphasis applied at step 302 in the encoder is applied, after which the left and right audio signals are ready for reproduction.

A skilled reader will appreciate that the above embodiment is presented by way of example only, and various modifications are possible within the scope of the invention in its various aspects disclosed herein.

Summing the numbers of bits for each data item in the bit stream of FIG. 5 reveals fewer than 47,000 bits are required per second, allowing for example 47 hours of audio signals to be stored in compressed form in a 1 gigabyte memory, be it a magnetic or optical disk or tape or solid state memory of similar form. Clearly the parameters of the encoding process and the allocation of bits to the different components of the bit stream can be adapted freely in accordance with the bandwidth and quality requirements of a given application.

Instead of coding tones by combining frequency, amplitude and phase into a single vector codebook, one or more of these variables could be encoded explicitly, although the vector quantization approach is believed to provide greater efficiency. For any of the scalar or vector quantization steps, different codebooks could in principle be provided for different types of music, and selected by information in the file header of each music track. It will be appreciated that the vector codebooks can be very large, however, so that transmitting the entire codebook as part of the encoded data would be inefficient. In contrast, pseudo-random codebooks can be generated locally at the encoder and decoder, with only a seed word needing to be transmitted in the file header or fixed in the decoder.

In another embodiment, linear prediction step 306 in the encoder can be performed before windowing step 304, with prediction step 706 in the decoder being performed after the overlap-and-add step 704. The signals being windowed, overlapped and added would then comprise the residuals of the linear prediction, rather than the original signal. The linear prediction filter process would be performed on a continuous stream of values, with coefficients being switched for each new frame at the point where the window functions cross. While it would be possible to blend the coefficients smoothly in accordance with the overlapping window functions of the frames, computationally cheap methods of blending can introduce instability and hence conspicuous noise.

The present embodiment includes all 512 transform coefficients in the encoded sub-bands. In other embodiments, the highest frequency coefficients may be discarded as being outside the bandwidth of the source signal. As described in EP-A-0513860, however, retaining some coefficients beyond that bandwidth can reduce quantization noise within the design bandwidth, depending on the transform used. The FFT or other transform may be used, either with blocks of 1024 samples, or a different number. The need for fast computation generally constrains the number of samples to integer powers of 2, or at least numbers such as 768 which can be factored into a set of small prime numbers.

In other applications, a very different audio sampling rate may apply. However, rather than use a fixed number of samples per frame, it is preferred to aim for a frame period similar to 20 ms, for example with frame lengths in the range 12 to 24 ms. This takes into account the nature of audio signals and the human auditory system, and the limitations of signal processing technology. As one example, an 8 kHz sample rate (used in telephony) may apply. A frame length of 16 ms (128 samples) or possibly 24 ms (192 samples) might be chosen, for example. Sampling rates of 32 kHz and 48 kHz are also common, besides 44.1 kHz.

As mentioned in the introduction above, each step of the encoding and decoding process can be implemented in software or hardware using readily available components. In the decoder, the Fourier transform occupies a major part of the decoding processing time, and a software implementation of the decoder could be assisted by a dedicated FFT processing chip, implemented using available digital signal processing technology. Alternatively, the entire decoder could be implemented in a dedicated chip, particularly where mass market applications are envisaged. Similar design freedoms exist in the encoder, although a skilled reader will appreciate that the vector codebook searches required at the encoding side constitute an additional computational burden. The exact implementation will therefore depend on what cost is acceptable for the encoding apparatus, and whether for example real-time encoding is necessary.

Referring to the computer architecture of the main unit 200 in FIG. 2, the skilled reader will appreciate that the instruction code for performing the encoding and/or decoding process can be supplied to such an apparatus on a removable storage device such as HDD 210', a CD-ROM or a floppy disc, or can alternatively be stored permanently in the ROM 206. The instruction codes for the decoding process can be supplied separately from the encoded audio data, or on the same storage device. In the latter case, any standard PC can reproduce the encoded sounds without previous installation of the appropriate decoder software.

The described embodiments enable good performance to be achieved without the use of adaptive vector formation, and without explicit analysis of spectral power and auditory masking phenomena. However, the invention does not exclude the use of these or other enhancements, which would be expected to achieve further performance benefits in the coding, at the cost of more complex hardware and/or software.

I claim:

1. A method of encoding a digital audio signal comprising:

transforming the digital audio signal in successive overlapping frames so as to obtain transform coefficients representing the signal in a transform domain;

grouping the transform coefficients into vectors and encoding the vectors by vector quantization to form a first component of encoded audio data; and subtracting from the transform coefficients for each frame prior to said vector quantization at least one tonal component, and encoding said at least one tonal component explicitly as a second component of the encoded audio data.

2. A method according to claim 1, further comprising a preliminary step of adaptively calculating and applying linear prediction coefficients so as to decorrelate the digital audio signal, the linear prediction coefficients being encoded to form a third component of the encoded audio data and the decorrelated audio signal being transformed in said transforming step for generation of said first and second components of the encoded audio data.

3. A method according to claim 2, wherein said linear prediction coefficients are calculated and applied for each of said frames.

4. A method according to claim 2, wherein in the preliminary step linear prediction is performed on a warped frequency scale.

5. A method according to claim 4, wherein in the preliminary step linear prediction is performed by bilinear transformation.

6. A method according to claim 2, further comprising a further preliminary step of fixed linear prediction effective to perform gross decorrelation.

7. A method according to claim 1, wherein said first component of encoded audio data includes codebook indices and scale factors for said vectors.

8. A method according to claim 7, wherein said scale factors are encoded predictively from frame-to-frame.

9. A method according to claim 7, wherein a separate scale factor is provided for each vector.

10. A method according to claim 1, wherein said transform coefficients are grouped into frequency sub-band vectors and each sub-band vector is encoded by said vector quantization.

11. A method according to claim 10, wherein said frequency sub-band vectors have frequency widths equal more on an auditory scale than on an absolute frequency scale.

12. A method according to claim 11, wherein said frequency sub-band vectors are substantially uniform in frequency width on a Bark scale.

13. A method according to claim 11, wherein each frequency sub-band vector is between one half bark and one bark in frequency width.

14. A method according to claim 1, wherein a plurality of tonal components are separately encoded in said second component of the encoded data for a given frame.

15. A method according to claim 14, wherein five or more tonal components are separately encoded in said second component of the encoded data for a given frame.

16. A method according to claim 1, wherein said at least one tonal component is encoded by vector quantization in the said transform domain.

17. A method according to claim 1, wherein each frame corresponds to a period in the range 12 to 24 milliseconds.

18. A method according to claim 1, wherein the number of bits allocated to each transform coefficient in the first component of the encoded audio data is fixed between frames.

19. A method according to claim 1, wherein the digital audio signal comprises plural spatial components, and in said step of grouping the transform coefficients into vectors the transform coefficients for said components are encoded independently for lower frequencies and in a combined form for higher frequencies.

20. An encoded audio signal conveying first and second components of audio data generated by:

transforming the digital audio signal in successive overlapping frames so as to obtain transform coefficients representing the signal in a transform domain;

grouping the transform coefficients in to vectors and encoding the vectors by vector quantization to form the first component of the encoded audio signal; and subtracting from the transform coefficients for each frame prior to said quantization at least one tonal component, and encoding said at least one tonal component explicitly as the second component of the encoded signal.

21. A signal according to claim 20, wherein the encoded audio signal is accompanied by executable instruction code for causing a general data processor to implement decoding of the encoded audio signal to recover the audio signal.

22. An apparatus for encoding a digital audio signal comprising:

means for transforming the digital audio signal in successive overlapping frames so as to obtain transform coefficients representing the signal in a transform domain;

means for grouping the transform coefficients into vectors and encoding the vectors by vector quantization to form a first component of encoded audio data;

means for subtracting from the transform coefficients for each frame prior to said vector quantization at least one tonal component explicitly as a second component of the encoded audio data.

23. An apparatus according to claim 22, further comprising adaptive linear prediction means for adaptively calculating and applying linear prediction coefficients so as to decorrelate the digital audio signal, and means for encoding the linear prediction coefficients to form a third component of the encoded audio data, wherein the transforming means is adapted to transform the decorrelated audio signal to generate said first and second components of the encoded audio data.

24. An apparatus according to claim 23, wherein said linear prediction means is adapted to calculate and apply the linear prediction coefficients for each of said frames.

25. An apparatus according to claim 23, wherein said linear prediction means is adapted to perform the linear prediction on a warped frequency scale.

26. An apparatus according to claim 25, wherein said linear prediction means is adapted to perform the linear prediction by bilinear transformation.

27. An apparatus according to claim 23, further comprising fixed linear prediction means for performing a fixed linear prediction effective to perform gross decorrelation of the digital audio signal prior to transformation by said transforming means.

28. An apparatus according to claim 22, wherein said grouping means is adapted to form said first component of encoded audio data to include codebook indices and scale factors for said vectors.

29. An apparatus according to claim 28, wherein said means for grouping the transform coefficients into vectors is adapted to encode said scale factors predictively from frame-to-frame.

30. An apparatus according to claim 28, wherein a separates scale factor is provided for each vector.

31. An apparatus according to claim 22, wherein said grouping means is adapted to group said transform coefficients into frequency sub-band vectors and to encode each sub-band vector by said vector quantization.

32. An apparatus according to claim 31, wherein said grouping means is adapted to group said transform coefficients into sub-bands having widths equal more on an auditory scale than on an absolute frequency scale.

33. An apparatus according to claim 32, wherein said grouping means is adapted to group said transform coefficients into sub-bands substantially uniform in width on a Bark scale.

34. An apparatus according to claim 32, wherein said grouping means is adapted to group said transform coefficients into sub-bands where each sub-band is between one half bark and one bark in width.

35. An apparatus according to claim 22, wherein said encoding means is adapted to separately encode a plurality of tonal components in said second component of the encoded audio data for a given frame.

36. An apparatus according to claim 35, wherein said encoding means is adapted to separately encode five or more tonal components in said second component of the encoded audio data for a given frame.

37. An apparatus according to claim 35, wherein said encoding means is adapted to separately encode said at least one tonal component by vector quantization in the said transform domain.

38. An apparatus according to claim 22, wherein said transforming means is adapted to transform the digital audio signal into frames where each frame corresponds to a period in the range 12 to 24 milliseconds.

39. An apparatus according to claim 22, wherein said grouping means is adapted to allocate bits to each transform coefficient in the first component of the encoded audio data fixed between frames.

40. An apparatus according to claim 22, wherein the digital audio signal comprises plural spatial components, and said grouping means is adapted to encode the transform coefficients for said components independently for lower frequencies and in a combined form for higher frequencies.

41. A method of decoding an encoded digital audio signal, comprising:

receiving from a data channel at least first and second data components for each of successive overlapping frames of an audio signal;

decoding said first data component using at last one vector codebook to obtain a set of transform coefficients for a given frame;

decoding said second data component to obtain transform coefficients representing at least one tonal component of the audio signal for a given frame;

combining the transform coefficients obtained from the first and second data component;

inverse transforming the combined transform coefficients of the given frame to obtain sample values of the audio signal; and combining the sample values obtained for successive frames so as to output a decoded digital audio signal.

42. A decoding method according to claim 41, performed by a general purpose processor operating under control of a stored program.

43. A decoding method according to claim 42, wherein said program is obtained as a preliminary step via the same data channel as the encoded audio data.

44. An apparatus for decoding an encoded digital audio signal, comprising:

means for receiving from a data channel at least first and second data components for each of successive overlapping frames of an audio signal;

means for decoding said first data component using at least one vector codebook to obtain a set of transform coefficients for a given frame;

means for decoding said second data components to obtain transform coefficients representing at least one tonal component of the audio signal for a given frame;

means for combining the transform coefficients obtained from the first and second data components;

means for inverse transforming the combined transform coefficients of the given frame to obtain sample values of the audio signal; and means for combining the sample values obtained for successive frames so as to output a decoded digital audio signal.

45. An apparatus according to claim 44, wherein said means comprise a general purpose processor operating under control of a stored program.

46. An apparatus according to claim 45, wherein said program has been obtained as a preliminary step via the same data channel as the encoded audio data.

47. A method of encoding a digital audio signal, including:

calculating transform coefficients to represent successive frames of said encoded digital audio signal in the frequency domain;

grouping the transform coefficients for each frame into frequency sub-band vectors; and encoding each frequency sub-band vector in the frequency domain by vector quantization to obtain at least a first component of encoded audio data.

48. A method according to claim 47, wherein the frequency sub-band vectors are more equal in frequency width on an auditory scale than on an absolute frequency scale.

49. A method according to claim 48, wherein each frequency sub-band vector is between one half bark and one bark in frequency width.

50. A method according to claim 47, wherein the encoded audio data includes both a vector codebook index for each sub-band vector and variable gains for each sub-band vector or group of sub-band vectors.

51. A method according to claim 50, wherein some or all of said variable gains are encoded predictively from frame to frame.

52. A method according to claim 47, further comprising at least one of the following, as preliminary steps:

decorrelation by fixed linear prediction;

decorrelation by adaptive linear prediction; and extraction of one or more tonal components in the frequency domain.

53. An encoded audio signal conveying encoded audio data generated by:

calculating transform coefficients to represent successive frames of a said digital audio signal in the frequency domain;

grouping the transform coefficients for each frame into frequency sub-band vectors; and encoding each frequency sub-band vector in the frequency domain by vector quantization to obtain at least a first component of encoded audio data.

54. A signal according to claim 53, wherein the encoded audio data is accompanied by instruction code for causing a general purpose processor to implement decoding of the encoded audio signal to recover the digital audio signal.

55. An apparatus for encoding a digital audio signal, including:
- means for calculating transform coefficients to represent successive frames of said digital audio signal in the frequency domain;
- means for grouping the transform coefficients for each frame into frequency sub-band vectors; and
- means for encoding each frequency sub-band vector in the frequency domain by vector quantization.

56. An apparatus according to claim 55, wherein said grouping means is adapted to group said transform coefficients into sub-bands more equal in width on an auditory scale than on an absolute frequency scale.

57. An apparatus according to claim 56, wherein said grouping means is adapted to group said transform coefficients into sub-bands, where each sub-band is between one half bark and one bark in width.

58. An apparatus according to claim 55, wherein said encoding means and said grouping means are adapted to encode the encoded audio data to include both a vector codebook index for each sub-band and variable gains for each sub-band or group of sub-bands.

59. An apparatus according to claim 58, wherein said encoding means is adapted to encode some or all of said gains predictively from frame to frame.

60. An apparatus according to claim 55, further comprising at least one of the following:
- means for performing decorrelation of the digital audio signal by fixed linear prediction prior to the calculation of said transform coefficients;
- means for performing decorrelation by adaptive linear prediction prior to the calculation of said transform coefficients; and
- means for extracting one or more tonal components in the frequency domain prior to said vector quantization.

61. A method of decoding an encoded digital audio signal, comprising:
- receiving from a data channel encoded data comprising a set of frequency sub-band vector index codes for each of successive overlapping frames of an audio signal;
- decoding each received vector index code by reference to a predetermined codebook, to obtain transform coefficients for a respective sub-band of the audio signal's frequency spectrum;
- concatenating the obtained transform coefficients for plural sub-bands to form one spectrum; and
- inverse transforming the concatenated transform coefficients to obtain a decoded digital audio signal.

62. A decoding method according to claim 61, performed by a general purpose processor operating under control of a stored program.

63. A decoding method according to claim 61, wherein said program is obtained as a preliminary step via the same data channel as the encoded audio data.

64. An apparatus for decoding an encoded digital audio signal, comprising:
- means for receiving from a data channel encoded audio data comprising a set of frequency sub-band vector index codes for each of successive overlapping frames of an audio signal;
- means for decoding each received vector index code by reference to a predetermined codebook, to obtain transform coefficients for a respective sub-band of the audio signal's frequency spectrum;
- means for concatenating the obtained transform coefficients for plural sub-bands to form one spectrum; and
- means for inverse transforming the concatenated transform coefficients to obtain a decoded digital audio signal.

65. An apparatus according to claim 64, wherein said means comprise a general purpose processor operating under control of a stored program.

66. An apparatus according to claim 65, including means for obtaining said program as a preliminary step via the same data channel as the encoded audio data.

67. A computer usable medium having computer readable instructions stored therein for causing a processor to encode a digital audio signal, the instructions comprising instructions for:
- causing the processor to transform the digital audio signal in successive overlapping frames so as to obtain transform coefficients representing the signal in a transformed domain;
- causing the processor to group the transform coefficients in defectors and encoding the vectors by vector quantization to form a first component of encoded audio data; and
- causing the process to subtract from the transform coefficients for each frame prior to said vector quantization at least one terminal component, and encoding each terminal component specifically as a second component of the encoded audio data.

68. A computer usable medium having computer readable instructions stored therein for causing a processor to decode an encoded digital audio signal, the instructions comprising instructions for:
- causing the processor to receive from a data channel at least first and second data components for each of successive overlapping frames of an audio signal;
- causing the processor to decode the said first data component using at least one vector code book to obtain a set of transform coefficients for a given frame;
- causing the processor to decode said second data component to obtain transform coefficients representing at least one tonal component of the audio signal for a given frame;
- causing the processor to combine the transform coefficient obtained from the first and second data components;
- causing the processor to inverse transform the combined transform coefficients of the given frame to obtain sample values of the audio signal; and
- causing the processor to combine the sample values obtained for successive frames so as to obtain a decoded digital audio signal.

69. A computer usable medium having computer readable instructions stored therein for causing a processor to encode a digital audio signal, the instructions comprising instructions for:
- causing the processor to calculate the transform coefficients to represent successive frames of said digital audio signal in the frequency domain;
- causing the processor to group the transform coefficients for each frame into frequencies sub-band vectors; and
- causing the processor to encode each frequency sub-band vector in the frequency domain by vector quantization to obtain at least a first component of encoded audio data.

70. A computer usable medium having computer readable instructions stored therein for causing a processor to decode an encoded digital audio signal, the instructions comprising instructions for:

causing the processor to receive from a data channel encoded data comprising a set of frequency sub-band vector index codes for each of successive overlapping frames of an audio signal;

causing the processor to decode each received vector index code by reference to a predetermined code book, to obtain transform coefficients for a respected sub-band of the audio signals frequency spectrum;

causing the processor to concatenate the obtained transform coefficients for plural sub-bands to form one spectrum; and causing the processor to inverse transform the concatenated transform coefficients to obtain a decoded digital audio signal.

* * * * *

UNITED STATES PATENT AND TRADEMARK OFFICE
CERTIFICATE OF CORRECTION

PATENT NO.: 5,999,899

DATED: Dec. 7, 1999

INVENTOR(S): Robinson

It is certified that error appears in the above-identified patent and that said Letters Patent is hereby corrected as shown below:

Title page, item [54] and col. 1,
Delete the title and insert therefor "LOW BIT RATE CODER AND DECODER OPERATING IN A TRANSFORM DOMAIN USING VECTOR QUANTIZATION"

Signed and Sealed this

Twelfth Day of September, 2000

Attest:

Q. TODD DICKINSON

*Attesting Officer*         *Director of Patents and Trademarks*